(12) United States Patent
Mitsutani

(10) Patent No.: US 8,466,655 B2
(45) Date of Patent: Jun. 18, 2013

(54) CHARGING SYSTEM FOR VEHICLE

(75) Inventor: Noritake Mitsutani, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 189 days.

(21) Appl. No.: 13/146,864

(22) PCT Filed: Feb. 3, 2009

(86) PCT No.: PCT/JP2009/051759
§ 371 (c)(1),
(2), (4) Date: Jul. 28, 2011

(87) PCT Pub. No.: WO2010/089844
PCT Pub. Date: Aug. 12, 2010

(65) Prior Publication Data
US 2011/0285350 A1 Nov. 24, 2011

(51) Int. Cl.
*H02J 7/00* (2006.01)

(52) U.S. Cl.
USPC .................. 320/109; 320/104; 320/137

(58) Field of Classification Search
USPC ........................................... 320/109
See application file for complete search history.

(56) References Cited

U.S. PATENT DOCUMENTS

| | | | | |
|---|---|---|---|---|
| 6,736,753 | B2 * | 5/2004 | Endo et al. ................. | 477/3 |
| 2002/0091655 | A1 * | 7/2002 | Agrafiotis et al. .......... | 706/26 |
| 2003/0205936 | A1 * | 11/2003 | Beckerman et al. ........ | 307/10.1 |
| 2004/0041035 | A1 * | 3/2004 | Takei et al. ................. | 236/34.5 |
| 2010/0233581 | A1 * | 9/2010 | Katano et al. .............. | 429/513 |

FOREIGN PATENT DOCUMENTS

| | | |
|---|---|---|
| JP | 5-095638 A | 4/1993 |
| JP | 5-300667 A | 11/1993 |
| JP | 7-194015 A | 7/1995 |
| JP | 2001-339803 A | 12/2001 |
| JP | 2008-306823 A | 12/2008 |

OTHER PUBLICATIONS

International Search Report issued May 12, 2009 of PCT/JP2009/051759.

* cited by examiner

*Primary Examiner* — Arun Williams
(74) *Attorney, Agent, or Firm* — Kenyon & Kenyon LLP

(57) ABSTRACT

A charge control device includes a charge power detection unit for detecting charge power supplied to a power storage device; a target value determination unit for determining a target value of the charge power to the power storage device; a first feedback control unit for correcting the target value based on the difference between the charge power and the target value to generate a power command value; a supply power detection unit for detecting supply power output from the charger; a guard target value determination unit for determining a guard target value corresponding to an upper limit value of the power command value based on allowable power of a system for charging; a second feedback control unit for correcting the guard target value based on the difference between the supply power detected by the supply power detection unit and the guard target value; and an upper limit guard processing unit for limiting the target value corrected by the first feedback control unit based on the guard target value corrected by the second feedback control unit.

5 Claims, 7 Drawing Sheets

FIG.6

| VAC SENSOR VALUE | VACSPC |
|---|---|
| 80≦VAC＜160(V) | 100V |
| 160≦VAC＜260(V) | 200V |

FIG.7

| CPLT DUTY RATIO | IACSPC |
|---|---|
| 18～22(%) | 12A |
| 24～28(%) | 16A |
| 48～52(%) | 24A |
| 58～62(%) | 32A |

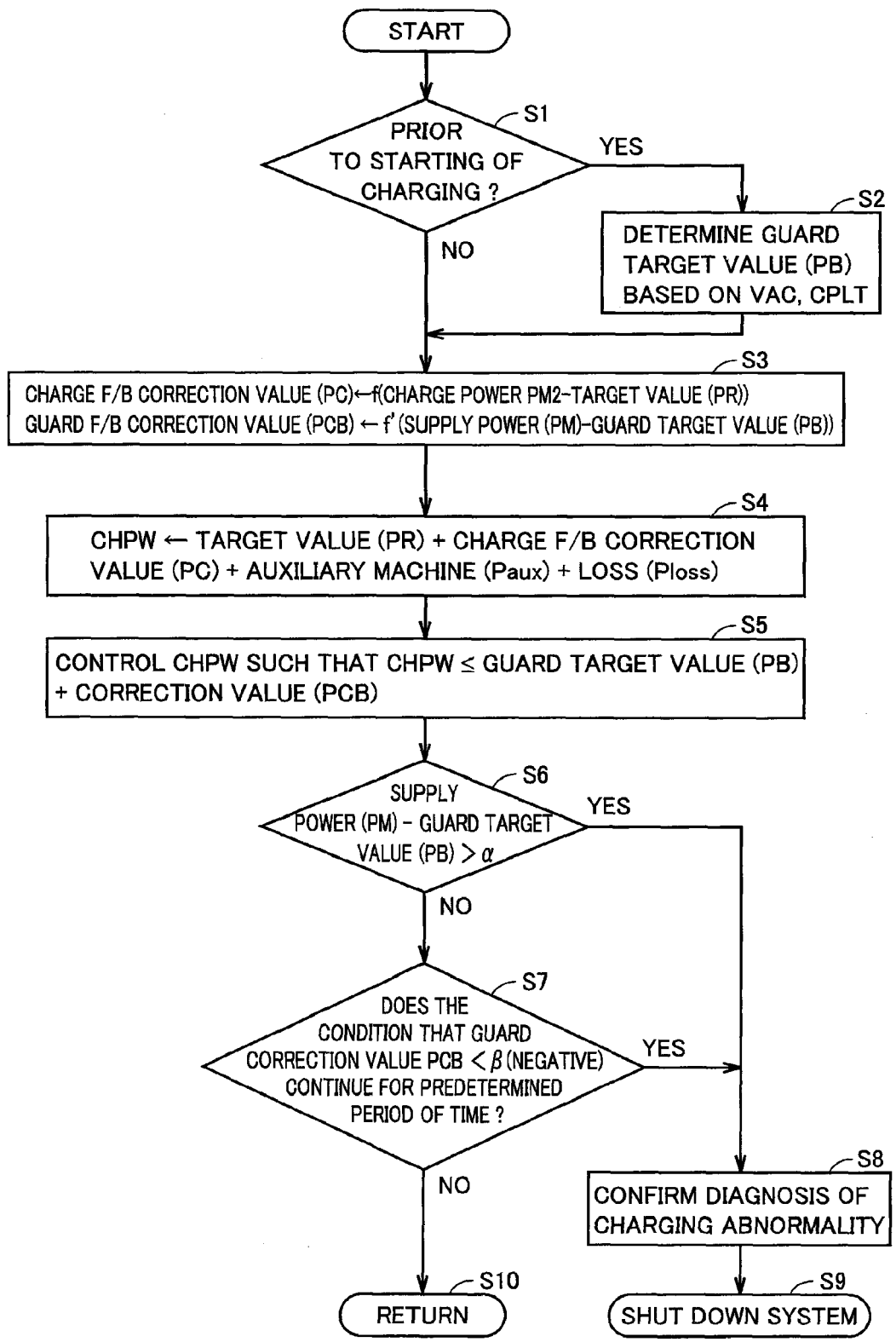

CHARGING SYSTEM FOR VEHICLE

This is a 371 national phase application of PCT/JP2009/051759 filed 3 Feb. 2009, the content of which is incorporated herein by reference.

TECHNICAL FIELD

The present invention relates to a charging system for a vehicle, and particularly to a charging system for a vehicle equipped with a power storage device configured such that it can be charged from the outside.

BACKGROUND ART

In recent years, a vehicle such as an electric vehicle and a hybrid vehicle equipped with a motor for driving the vehicle and a battery for driving the motor has been actively developed as an environmentally-friendly vehicle.

Japanese Patent Laying-Open No. 07-194015 (Patent Document 1) discloses a charge control device for charging a battery mounted in an electric vehicle. The charge control device receives an input of the detected value of each of an abnormality detection sensor and a current sensor. When determining that the battery normally operates, the charge control device feeds back the value of the current sensor so as to adjust a power control unit to supply an optimum charging current to the battery for performing charging. In the event of detection of the state where the battery should not be charged, such as a state where an abnormality occurs in the battery or the battery is fully charged, the electric power output from the power control unit is adjusted such that the detected value of the current sensor is approximately equal to 0. Accordingly, the electric power supplied to the fan and the like operating when an abnormality occurs in the battery is directly supplied from the charge control device, but not discharged from or supplied to the battery having an abnormality or fully charged.

Patent Document 1: Japanese Patent Laying-Open No. 07-194015

DISCLOSURE OF THE INVENTION

Problems to be Solved by the Invention

Recently, studies have been conducted to implement a plug-in hybrid vehicle provided with a power storage device of a hybrid vehicle configured such that it can be charged from the outside as with an electric vehicle.

In the case where the power storage device mounted in the vehicle such as an electric vehicle and a hybrid vehicle is charged from outside the vehicle at home and the like, it is desirable to increase the amount of the electric power to be supplied as much as possible, in order to shorten the charging time period. However, an excessive increase in the charge power may cause the breaker provided on the external power supply side to detect an excessive current, leading to interruption of the charge path. This rarely occurs during the normal operation, but there is concern that the control device for controlling charging may require an excessive electric power when certain abnormalities occur in a system for charging. Therefore, it is preferable to impose a certain limitation in advance.

An object of the present invention is to provide a charging system for a vehicle which is capable of preventing an overcurrent in the external power supply and also preventing a breaker from tripping, even in the case where an abnormality occurs in the vehicle or the charger.

Means for Solving the Problems

In summary, the present invention provides a charging system for a vehicle for charging a power storage device mounted in the vehicle. The charging system includes a charger configured to supply electric power from a power supply external to the vehicle so as to charge the power storage device; and a charge control device for controlling the charger by generating a power command value to the charger. The charge control device includes a charge power detection unit for detecting charge power supplied to the power storage device; a target value determination unit for determining a target value of the charge power to the power storage device; a first feedback control unit for correcting the target value based on a difference between the charge power and the target value to generate the power command value; a supply power detection unit for detecting supply power output from the charger; a guard target value determination unit for determining a guard target value corresponding to an upper limit value of the power command value based on allowable power of a system for charging; a second feedback control unit for correcting the guard target value based on a difference between the supply power detected by the supply power detection unit and the guard target value; and an upper limit guard processing unit for limiting the target value corrected by the first feedback control unit based on the guard target value corrected by the second feedback control unit.

Preferably, the guard target value determination unit obtains, from a signal transmission device, information indicative of an allowable power value of a path through which the electric power is transmitted to the vehicle from the power supply external to the vehicle, the signal transmission device being provided on the path.

Further preferably, the charging system for a vehicle further includes an abnormality monitoring unit for monitoring an abnormality in the charger based on the guard target value, the supply power and a correction value determined by the second feedback control unit.

Preferably, the vehicle includes an auxiliary machine capable of being driven by a part of the electric power output from the charger. The power storage device includes a first power storage device connected to a power supply path to the auxiliary machine, and a second power storage device to which an output of the charger is connected. The charging system for a vehicle further includes a first voltage converter performing voltage conversion between a voltage of the first power storage device and a supply voltage to an electric load, and a second voltage converter performing voltage conversion between a voltage of the second power storage device and the supply voltage. The charge control device is configured to control the first and second voltage converters to select one of the first and second power storage devices as a target to be supplied with the charge power from the charger.

Preferably, the vehicle includes a motor for driving the vehicle operating with the electric power received from the power storage device, and an internal combustion engine used for driving the vehicle in combination with the motor.

Effects of the Invention

The present invention can serve to prevent an overcurrent in the external power supply and also prevent breaker tripping during charging of the power storage device mounted in the vehicle.

BRIEF DESCRIPTION OF THE DRAWINGS

FIG. 6 is a diagram for illustrating a voltage standard value VACSPC determined by a guard target value determination unit 61 in FIG. 5.

FIG. 7 is a diagram for illustrating a current standard value IACSPC determined by guard target value determination unit 61 in FIG. 5.

FIG. 8 is a flowchart for illustrating the program control performed in charging ECU 46.

Figure 1:
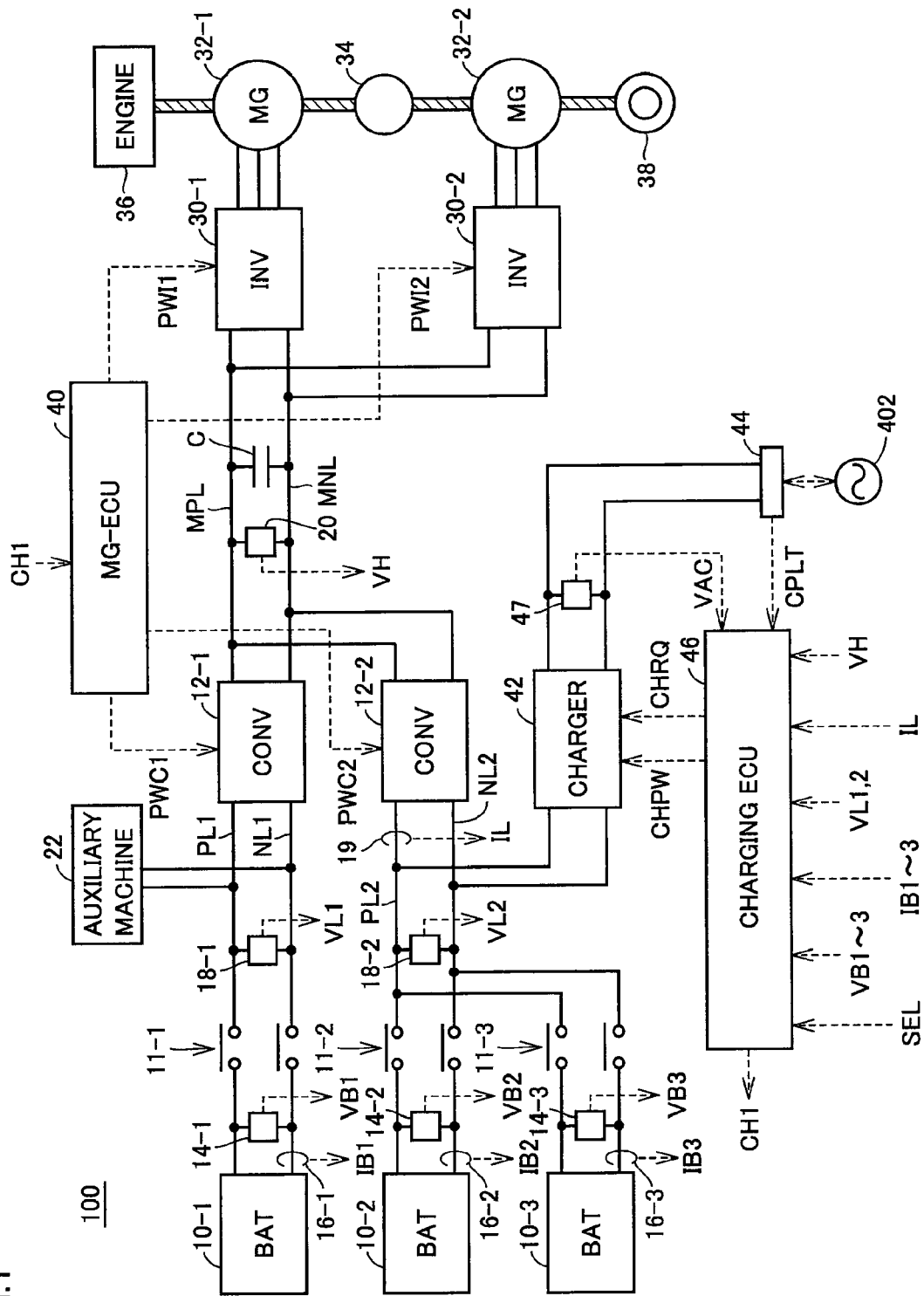
FIG. 1 is an overall block diagram of a hybrid vehicle shown as an example of an electric vehicle according to the present invention.

DESCRIPTION OF THE REFERENCE SIGNS 19, 92, 95 current sensor, 20, 91, 93, 94 voltage sensor, 22 auxiliary machine, 34 power split device, 36 engine, 38 driving wheel, 40 MG-ECU, 42 charger, 44 inlet, 46 charging ECU, 47 voltage sensor, 51 charge power target value determination unit, 52 charge power detection unit, 53 subtraction unit, 54, 64 feedback control unit, 55, 56, 57, 65 addition unit, 61 guard target value determination unit, 62 charger supply power detection unit, 63 subtraction unit, 66 upper limit guard processing unit, 80 power limitation unit, 81 filter, 82 AC/DC conversion unit, 83 smoothing capacitor, 84 DC/AC conversion unit, 85 insulating transformer, 86 rectification unit, 87 temperature sensor, 88 microcomputer, 100 hybrid vehicle, 300 charging cable, 310 connector, 312 switch, 320 plug, 330 CCID, 332 relay, 334 control pilot circuit, 400 wall outlet, 402 external power supply, C smoothing capacitor, C1 smoothing capacitor, D1A, D1B diode, L1 inductor, LN1A positive bus, LN1B wiring, LN1C negative bus, MNL main negative bus, MPL main positive bus, NL1, NL2, NLC negative electrode line, PL1, PL2, PLC positive electrode line, Q1A, Q1B switching element.

BEST MODES FOR CARRYING OUT THE INVENTION

The embodiments of the present invention will be hereinafter described in detail with reference to the accompanying drawings, in which the same or corresponding components are designated by the same reference characters, and description thereof will not be repeated.

[Overall Configuration of Vehicle]

FIG. 1 is an overall block diagram of a hybrid vehicle shown as an example of an electric vehicle according to the present invention.

Referring to FIG. 1, a hybrid vehicle 100 includes power storage devices 10-1 to 10-3, system main relays 11-1 to 11-3, converters 12-1 and 12-2, a main positive bus MPL, a main negative bus MNL, a smoothing capacitor C, and an auxiliary machine 22. Hybrid vehicle 100 further includes inverters 30-1 and 30-2, motor generators 32-1 and 32-2, a power split device 34, an engine 36, and a driving wheel 38. Hybrid vehicle 100 further includes voltage sensors 14-1 to 14-3, 18-1, 18-2, and 20, current sensors 16-1 to 16-3 and 19, and an MG-ECU (electronic control unit) 40. Hybrid vehicle 100 also includes a charger 42, a vehicle inlet 44, and a charging ECU 46.

Each of power storage devices 10-1 to 10-3 serves as a rechargeable direct-current (DC) power supply including, for example, a secondary battery such as nickel-metal hydride or lithium-ion secondary battery, a large-capacity capacitor, and the like. Power storage device 10-1 is connected to converter 12-1 through system main relay 11-1. Power storage devices 10-2 and 10-3 are connected to converter 12-2 through system main relays 11-2 and 11-3, respectively.

System main relay 11-1 is provided between power storage device 10-1 and converter 12-1. System main relay 11-2 is provided between power storage device 10-2 and converter 12-2. System main relay 11-3 is provided between power storage device 10-3 and converter 12-2. In order to prevent a short circuit between power storage device 10-2 and power storage device 10-3, system main relays 11-2 and 11-3 are not simultaneously but selectively turned on.

Converters 12-1 and 12-2 are arranged in parallel with each other, and each connected to main positive bus MPL and main negative bus MNL. Based on a signal PWC1 from MG-ECU 40, converter 12-1 performs voltage conversion between power storage device 10-1 and main positive and negative busses MPL and MNL. Based on a signal PWC2 from MG-ECU 40, converter 12-2 performs voltage conversion between power storage device 10-2 or 10-3 electrically connected to converter 12-2 and main positive and negative busses MPL and MNL.

Auxiliary machine 22 is connected to a positive electrode line PL1 and a negative electrode line NL1 which are provided between system main relay 11-1 and converter 12-1. Smoothing capacitor C is connected between main positive bus MPL and main negative bus MNL, and distributes the electric power to each of the power storage devices through main positive bus MPL and main negative bus MNL.

Inverters 30-1 and 30-2 are arranged in parallel with each other, and each connected to main positive bus MPL and main negative bus MNL. Inverter 30-1 drives motor generator 32-1 based on a signal PWI1 from MG-ECU 40. Inverter 30-2 drives motor generator 32-2 based on a signal PWI2 from MG-ECU 40.

Motor generators 32-1 and 32-2 each are an alternating-current (AC) rotating electric machine including, for example, a permanent magnet type synchronous electric motor provided with a rotor into which a permanent magnet is incorporated. Motor generators 32-1 and 32-2 are coupled to power split device 34. Power split device 34 includes a planetary gear having a sun gear, a pinion gear, a carrier, and a ring gear. The pinion gear engages with the sun gear and the ring gear. The carrier is coupled to the crankshaft of engine 36 while rotatably supporting the pinion gear. The sun gear is coupled to the rotation shaft of motor generator 32-1. The ring gear is coupled to the rotation shaft of motor generator 32-2 and driving wheel 38. Power split device 34 serves to split the power generated by engine 36 into a path through which the power is transmitted to driving wheel 38 and a path through which the power is transmitted to motor generator 32-1.

Motor generator 32-1 generates electric power using the power of engine 36 split by power split device 34. For example, when the state of charge (SOC) of each of power storage devices 10-1 to 10-3 decreases, engine 36 is started and motor generator 32-1 generates electric power, which is then supplied to the power storage device.

In contrast, motor generator 32-2 generates driving force by using at least one of the electric power supplied from at least one of power storage devices 10-1 to 10-3 and the electric power generated by motor generator 32-1. The driving force of motor generator 32-2 is transmitted to driving wheel 38. During braking of the vehicle, the kinetic energy of the vehicle is transmitted from driving wheel 38 to motor generator 32-2 which is then driven to operate as a power generator. Thus, motor generator 32-2 operates as a regenerative brake for converting the kinetic energy of the vehicle into electric power for collection.

MG-ECU 40 generates signals PWC1 and PWC2 for driving converters 12-1 and 12-2, respectively, and outputs the generated signals PWC1 and PWC2 to converters 12-1 and 12-2, respectively. MG-ECU 40 also generates signals PWI1 and PWI2 for driving motor generators 32-1 and 32-2, respectively, and outputs the generated signals PWI1 and PWI2 to inverters 30-1 and 30-2, respectively.

Furthermore, in the case where power storage device 10-1 is charged by charger 42, when a signal CH1 received from charging ECU 46 is activated, MG-ECU 40 generates and outputs signals PWC1 and PWC2 to converters 12-1 and 12-2, respectively, such that charge power may be supplied from charger 42 sequentially through converter 12-2, main positive bus MPL and main negative bus MNL, and converter 12-1 to power storage device 10-1.

Charger 42 has an input terminal connected to vehicle inlet 44 and has an output terminal connected to a positive electrode line PL2 and a negative electrode line NL2 which are disposed between converter 12-2 and system main relays 11-2 and 11-3. Charger 42 receives the electric power supplied from a power supply 402 external to the vehicle (hereinafter also referred to as an "external power supply") through vehicle inlet 44. Charger 42 then receives a power command value CHPW from charging ECU 46 to control the output voltage of charger 42 to be set at a predetermined DC voltage and also control the output power of charger 42 to be equal to power command value CHPW. Vehicle inlet 44 serves as a power interface for receiving electric power from external power supply 402.

Voltage sensors 14-1 to 14-3 detect a voltage VB1 of power storage device 10-1, a voltage VB2 of power storage device 10-2 and a voltage VB3 of power storage device 10-3, respectively, and then output the detected values to charging ECU 46. Current sensors 16-1 to 16-3 detect a current IB1 input to and output from power storage device 10-1, a current IB2 input to and output from power storage device 10-2, and a current IB3 input to and output from power storage device 10-3, respectively, and then output the detected values to charging ECU 46.

Voltage sensors 18-1 and 18-2 detect a voltage VL1 between positive electrode line PL1 and negative electrode line NL1, and a voltage VL2 between positive electrode line PL2 and negative electrode line NL2, respectively, and then output the detected values to charging ECU 46. Current sensor 19 detects a current IL on positive electrode line PL2 input to and output from converter 12-2, and then outputs the detected value to charging ECU 46. It is to be noted that current sensor 19 can detect the current flowing from charger 42 into converter 12-2 when power storage device 10-1 is charged by charger 42. Voltage sensor 20 detects a voltage VH between main positive bus MPL and main negative bus MNL, and then outputs the detected value to charging ECU 46.

When power storage devices 10-1 to 10-3 are charged by external power supply 402 connected to vehicle inlet 44, charging ECU 46 receives a target value PR of the charge power (kWh) of power storage devices 10-1 to 10-3 from a vehicle ECU which is not shown. Charging ECU 46 also receives, from the above-described vehicle ECU, a signal SEL indicating as to which of power storage devices 10-1 to 10-3 is charged by charger 42. In other words, in the first embodiment, power storage devices 10-1 to 10-3 are charged sequentially in the predetermined order.

When power storage device 10-1 is charged, charging ECU 46 outputs signal CH1 to MG-ECU 40, and converters 12-1 and 12-2 operate so as to cause the electric power to flow from charger 42 sequentially through converters 12-2 and 12-1 into power storage device 10-1. In this case, when power storage device 10-1 is charged, auxiliary machine 22 connected between power storage device 10-1 and converter 12-1 operates with the electric power supplied from charger 42. In contrast, when power storage device 10-2 or 10-3 is charged, auxiliary machine 22 receives electric power from power storage device 10-1.

When external power supply 402 charges power storage devices 10-1 to 10-3, charging ECU 46 generates power command value CHPW indicative of the target value of the electric power output from charger 42, and outputs the generated power command value CHPW to charger 42.

Then, charging ECU 46 receives the detected value of each of voltages VB1 to VB3, VL1, VL2 and VH, and currents IB1 to IB3 and M. Based on each of the above detected values, charging ECU 46 performs feedback correction for power command value CHPW of charger 42 such that the charge power actually supplied to power storage devices 10-1 to 10-3 is equal to target value PR. In other words, in the present embodiment, not only charger 42 is controlled such that the output power of charger 42 is equal to the target value, but also power command value CHPW is feedback-corrected based on the state of the power storage device such that the actual charge power of the power storage device is equal to the target value. This allows the charge power of power storage devices 10-1 to 10-3 to be equal to target value PR with reliability.

Hybrid vehicle 100 further includes a voltage sensor 47 detecting a voltage VAC which is input from external power supply 402. Charging ECU 46 receives the detection result provided from voltage sensor 47. Charging ECU outputs power command value CHPW to charger 42 and also outputs, to charger 42, a control signal CHRQ used for controlling charger 42 to be turned on and off.

Figure 2:
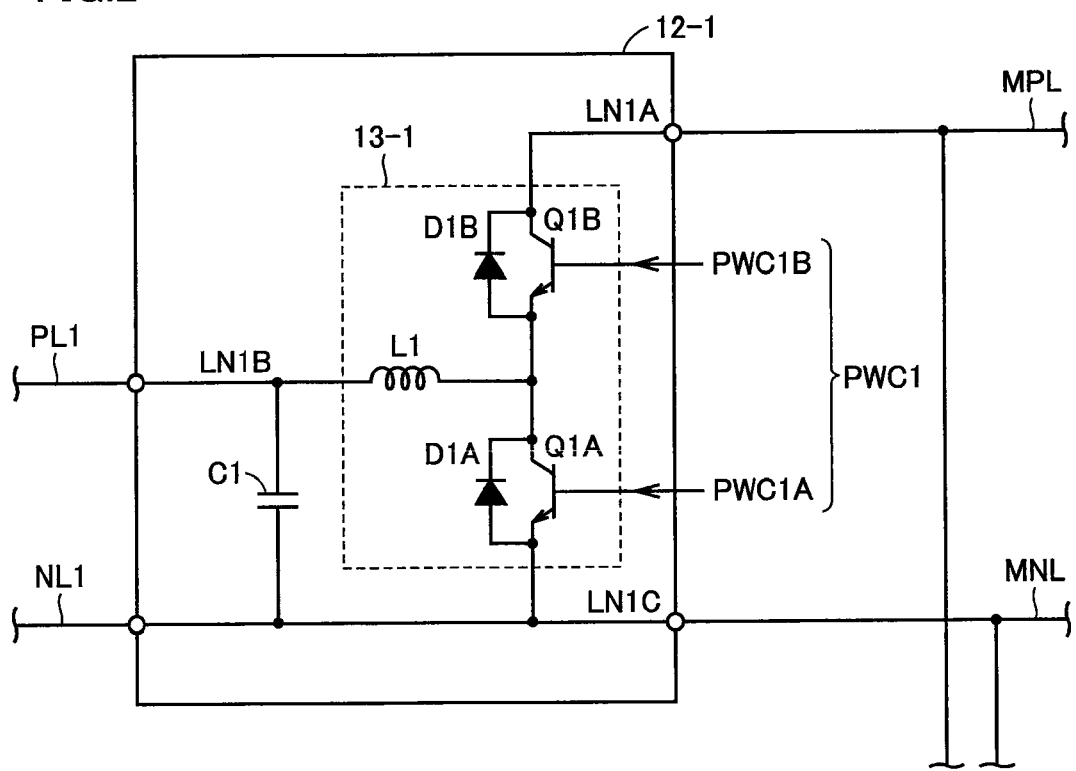
FIG. 2 is a schematic configuration diagram of converters 12-1 and 12-2 shown in FIG. 1, in which since the configuration and operation of each of the converters are the same, the configuration and operation of converter 12-1 will be hereinafter described as a representative example.

FIG. 2 is a schematic configuration diagram of converters 12-1 and 12-2 shown in FIG. 1. Since the configuration and operation of each of the converters are the same, the configuration and operation of converter 12-1 will be hereinafter described as a representative example.

Referring to FIG. 2, converter 12-1 includes a chopper circuit 13-1, a positive bus LN1A, a negative bus LN1C, a wiring LN1B, and a smoothing capacitor C1. Chopper circuit 13-1 includes switching elements Q1A, Q1B, diodes D1A, D1B, and an inductor L1.

Positive bus LN1A has one end connected to a collector of switching element Q1B and the other end connected to main positive bus MPL. Negative bus LN1C has one end connected to negative electrode line NL1 and the other end connected to main negative bus MNL.

Switching elements Q1A and Q1B are connected in series between negative bus LN1C and positive bus LN1A. Specifically, the emitter of switching element Q1A is connected to negative bus LN1C, and the collector of switching element Q1B is connected to positive bus LN1A. Diodes D1A and D1B are connected in reverse parallel with switching elements Q1A and Q1B, respectively. Inductor L1 is connected between wiring LN1B and the connection node of switching elements Q1A and Q1B.

Wiring LN1B has one end connected to positive electrode line PL1 and the other end connected to inductor L1. Smoothing capacitor C1 is connected between wiring LN1B and negative bus LN1C, and reduces an AC component contained in the DC voltage between wiring LN1B and negative bus LN1C.

In accordance with signal PWC1 from MG-ECU 40 (FIG. 1), chopper circuit 13-1 performs bidirectional DC voltage conversion between power storage device 10-1 (FIG. 1) and main positive and negative busses MPL and MNL. Signal PWC1 contains a signal PWC1A used for controlling switching element Q1A forming a lower arm element to be turned on and off, and a signal PWC1B used for controlling switching element Q1B forming an upper arm element to be turned on and off. MG-ECU 40 then controls the duty ratio (the ratio between the on-period and the off-period) of each of switching elements Q1A, Q1B within a certain duty cycle (the sum of the on-period and the off-period).

When switching elements Q1A and Q1B are controlled such that the on-duty of switching element Q1A is increased (since switching elements Q1A and Q1B are controlled to be complementarily turned on/off except for the dead time period, the on-duty of switching element Q1B is decreased), the amount of the pump current flowing from power storage device 10-1 through inductor L1 increases, which causes an increase in the electromagnetic energy accumulated in inductor L1. This results in an increase in the amount of the current discharged from inductor L1 through diode D1B to main positive bus MPL at the timing when switching element Q1A is switched from the ON state to the OFF state, and thus, the voltage on main positive bus MPL is increased.

In contrast, when switching elements Q1A and Q1B are controlled such that the on-duty of switching element Q1B is increased (the on-duty of switching element Q1A is decreased), the amount of the current flowing from main positive bus MPL through switching element Q1B and inductor L1 into power storage device 10-1 increases, which causes a decrease in the voltage on main positive bus MPL.

Thus, by controlling the duty ratio of each of switching elements Q1A and Q1B, the voltage on main positive bus MPL can be controlled, and the direction of the current (electric power) and the amount of the current (amount of the electric power) flowing between power storage device 10-1 and main positive bus MPL can also be controlled.

Figure 3:
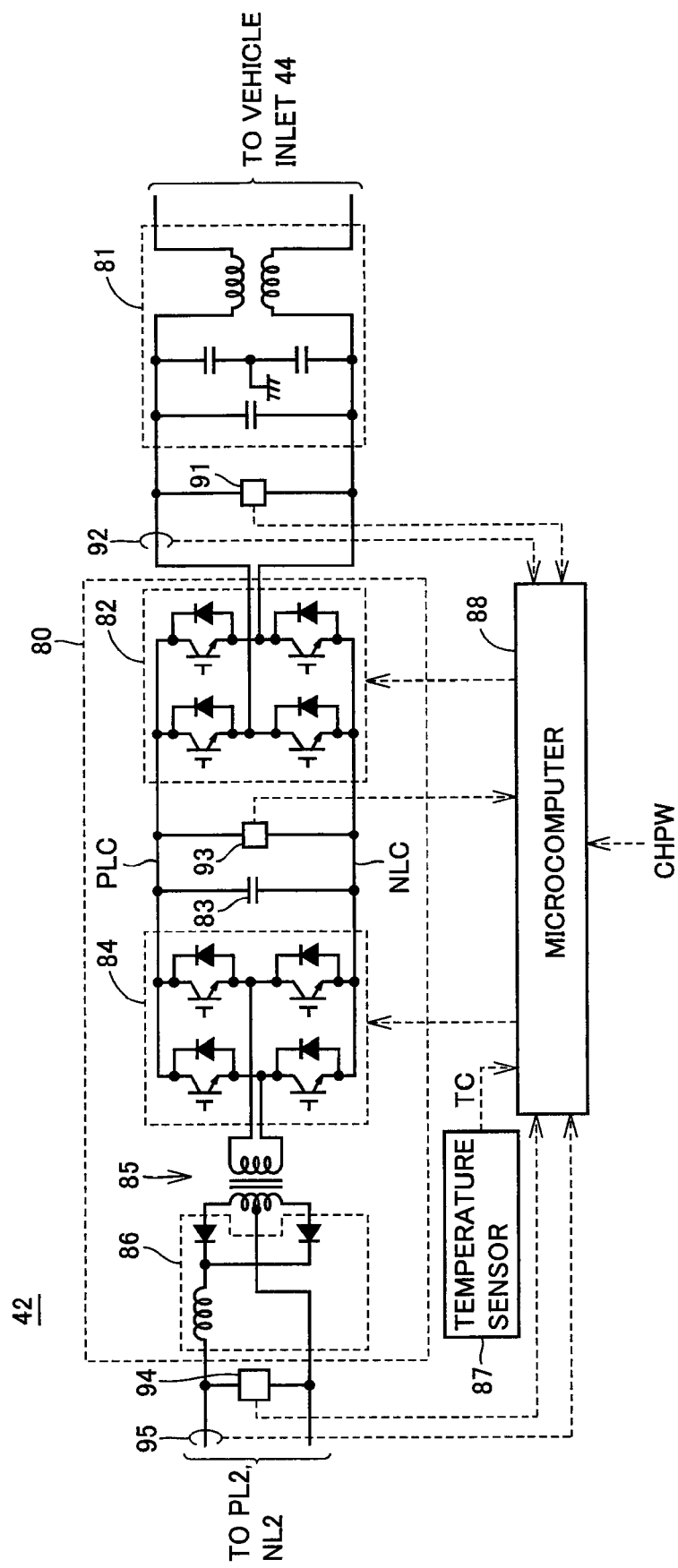
FIG. 3 is a schematic configuration diagram of a charger 42 shown in FIG. 1.

FIG. 3 is a schematic configuration diagram of charger 42 shown in FIG. 1.

Referring to FIG. 3, charger 42 includes a filter 81, a power limitation unit 80, a temperature sensor 87, voltage sensors 91, 93 and 94, current sensors 92 and 95, and a microcomputer 88.

Power limitation unit 80 includes an AC/DC conversion unit 82, a smoothing capacitor 83, a DC/AC conversion unit 84, an insulating transformer 85, and a rectification unit 86.

Filter 81 is disposed between vehicle inlet 44 (FIG. 1) and AC/DC conversion unit 82, and prevents vehicle inlet 44 from outputting high frequency noise to external power supply 402 during charging of power storage devices 10-1 to 10-3 by external power supply 402 (FIG. 1). AC/DC conversion unit 82 includes a single-phase bridge circuit. Based on the drive signal from microcomputer 88, AC/DC conversion unit 82 converts the AC power supplied from external power supply 402 into a DC power, which is then output to a positive electrode line PLC and a negative electrode line NLC. Smoothing capacitor 83 connected between positive electrode line PLC and negative electrode line NLC serves to reduce the power variation component contained between positive electrode line PLC and negative electrode line NLC.

DC/AC conversion unit 84 includes a single-phase bridge circuit. Based on the drive signal from microcomputer 88, DC/AC conversion unit 84 converts the DC power supplied through positive electrode line PLC and negative electrode line NLC into an AC power of high frequency, which is then output to insulating transformer 85. Insulating transformer 85 includes a core containing magnetic material, and a primary coil and a secondary coil which are wound around the core. The primary and secondary coils are electrically insulated and connected to DC/AC conversion unit 84 and rectification unit 86, respectively. Insulating transformer 85 converts the AC power of high frequency supplied from DC/AC conversion unit 84 into the voltage level in accordance with the turns ratio between the primary coil and the secondary coil, and outputs the resultant to rectification unit 86. Rectification unit 86 rectifies the AC power output from insulating transformer 85 to a DC power, which is then output to positive electrode line PL2 and negative electrode line NL2.

Voltage sensor 91 detects the voltage of external power supply 402 which has been passed through filter 81, and outputs the detected value to microcomputer 88. Current sensor 92 detects the current supplied from external power supply 402, and outputs the detected value to microcomputer 88. Voltage sensor 93 detects the voltage between positive electrode line PLC and negative electrode line NLC, and outputs the detected value to microcomputer 88. Voltage sensor 94 detects the voltage on the output side of rectification unit 86, and outputs the detected value to microcomputer 88. Current sensor 95 detects the current output from rectification unit 86, and outputs the detected value to microcomputer 88.

Based on the detected values from voltage sensors 91, 93 and 94 and current sensors 92 and 95, microcomputer 88 generates a drive signal used for driving AC/DC conversion unit 82 and DC/AC conversion unit 84 such that the output power of charger 42 calculated based on the detected values from voltage sensor 94 and current sensor 95 is equal to power command value CHPW. Microcomputer 88 then outputs the generated drive signal to AC/DC conversion unit 82 and DC/AC conversion unit 84.

Temperature sensor 87 detects whether the condition of the power-saving operation that charger 42 may possibly become overheated is satisfied or not. Specifically, temperature sensor 87 detects and transmits a temperature TC of charger 42 to microcomputer 88. Microcomputer 88 changes the operation mode of charger 42 between the saving mode and the normal mode based on temperature TC transmitted from temperature sensor 87. Power limitation unit 80 limits the electric power from the power supply external to the vehicle under the control by microcomputer 88, and supplies the resultant electric power as charge power to power storage devices 10-1 to 10-3.

Figure 4:
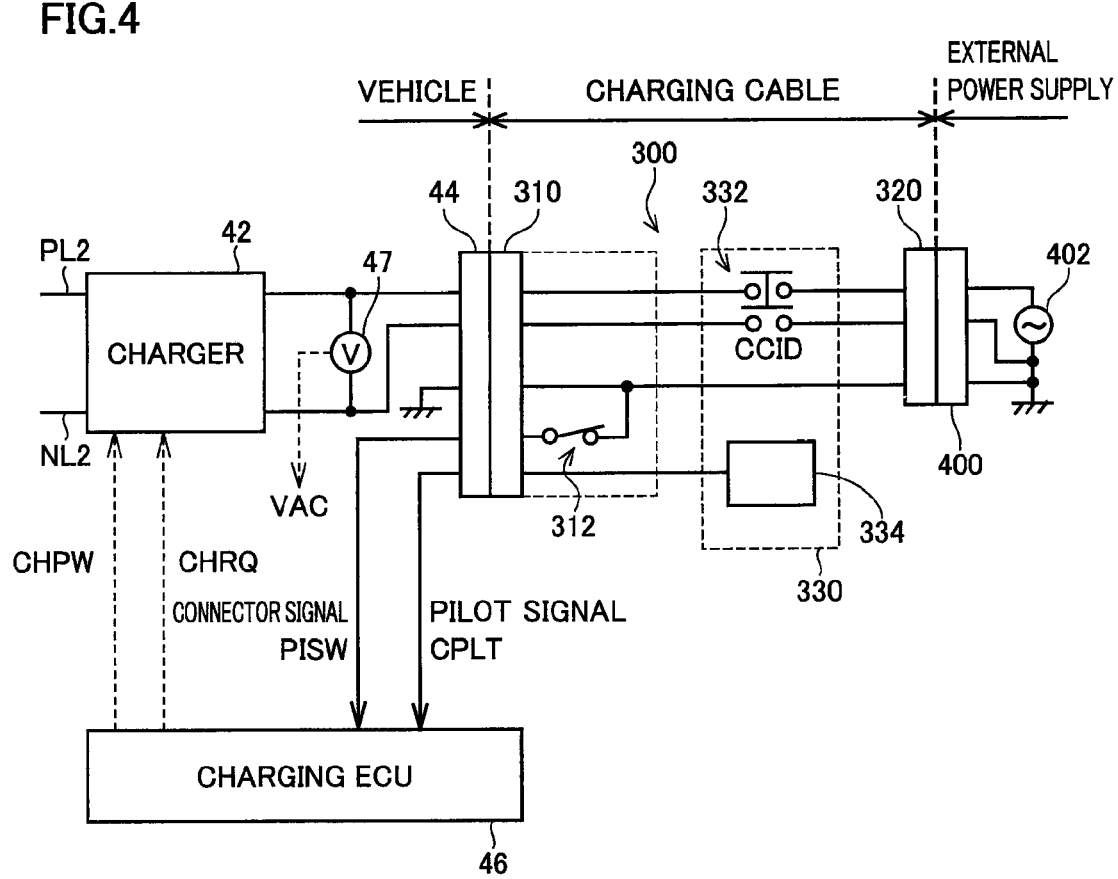
FIG. 4 is a diagram for illustrating a pilot signal CPLT input to charging ECU 46.

FIG. 4 is a diagram for illustrating a pilot signal CPLT input to charging ECU 46.

Referring to FIG. 4, the charge path from an external power supply 402 through a charging cable 300 to an add-on charger 42 on the vehicle is shown.

Inlet 44 is provided, for example, on the side of a plug-in hybrid vehicle. A connector 310 of charging cable 300 coupling the plug-in hybrid vehicle and external power supply 402 is connected to inlet 44.

Charging cable 300 coupling the plug-in hybrid vehicle and external power supply 402 includes connector 310, a plug 320 and a CCID (charging circuit interrupt device) 330.

Connector 310 of charging cable 300 is connected to inlet 44 provided on the plug-in hybrid vehicle. Connector 310 is provided with a switch 312. When switch 312 is closed in the state where connector 310 of charging cable 300 is connected to inlet 44 provided on the plug-in hybrid vehicle, charging ECU 46 receives a connector signal PISW indicating that connector 310 is connected to inlet 44.

Switch 312 opens and closes in coordination with an anchor fitting which anchors connector 310 of charging cable 300 to inlet 44 of the hybrid vehicle. The anchor fitting swings by the user pressing the button provided on connector 310.

Plug 320 of charging cable 300 is connected to a wall outlet 400 provided in the house. Wall outlet 400 receives the AC electric power from power supply 402 external to the plug-in hybrid vehicle.

CCID 330 includes a relay 332 and a control pilot circuit 334. In the state where relay 332 is opened, the path is interrupted through which power supply 402 external to the plug-in hybrid vehicle supplies the electric power to the plug-in hybrid vehicle. In the state where relay 332 is closed, the electric power can be supplied to the plug-in hybrid vehicle from power supply 402 external to the plug-in hybrid vehicle. Charging ECU 46 controls the state of relay 332 in the state where connector 310 of charging cable 300 is connected to inlet 44 of the plug-in hybrid vehicle.

Control pilot circuit 334 transmits a pilot signal (square wave signal) CPLT to a control pilot line in the state where plug 320 of charging cable 300 is connected to wall outlet 400, that is, external power supply 402, and where connector 310 is connected to inlet 44 provided on the plug-in hybrid vehicle. The oscillator disposed within control pilot circuit 334 oscillates the pilot signal.

When plug 320 of charging cable 300 is connected to wall outlet 400, control pilot circuit 334 may output a constant pilot signal CPLT even if connector 310 is disconnected from inlet 44 provided on the plug-in hybrid vehicle. However, charging ECU 46 cannot detect the output pilot signal CPLT in the state where connector 310 is disconnected from inlet 44 provided on the plug-in hybrid vehicle.

When plug 320 of charging cable 300 is connected to wall outlet 400 and connector 310 is connected to inlet 44 of the plug-in hybrid vehicle, control pilot circuit 334 oscillates pilot signal CPLT of a predetermined pulse width (duty cycle).

The plug-in hybrid vehicle is informed of the current capacity that can be supplied in accordance with the pulse width of pilot signal CPLT. For example, the plug-in hybrid vehicle is informed of the current capacity of charging cable 300. The pulse width of pilot signal CPLT is constant independently of the voltage and the current of external power supply 402. The current capacity of charging cable 300 is selected so as to accommodate the capacity of the breaker of external power supply 402.

In the case where a different charging cable is used, the pulse width of pilot signal CPLT may vary. In other words, the pulse width of pilot signal CPLT may be set for each type of the charging cables.

In the present embodiment, in the state where the plug-in hybrid vehicle and external power supply 402 are coupled by charging cable 300, power storage devices 10-1 to 10-3 in FIG. 1 are charged with the electric power supplied from external power supply 402. During charging of power storage devices 10-1 to 10-3, corresponding system main relays 11-1 to 11-3 and relay 332 in COD 330 are closed.

Voltage sensor 47 provided inside the plug-in hybrid vehicle detects AC voltage VAC of external power supply 402. The detected voltage VAC is transmitted to charging ECU 46.

Charging ECU 46 detects based on connector signal PISW that the charging cable is connected to the inlet, detects the allowable current value of the charging cable based on pilot signal CPLT, and outputs, to charger 42, power command value CHPW and control signal CHRQ used for controlling turning on and off.

Figure 5:
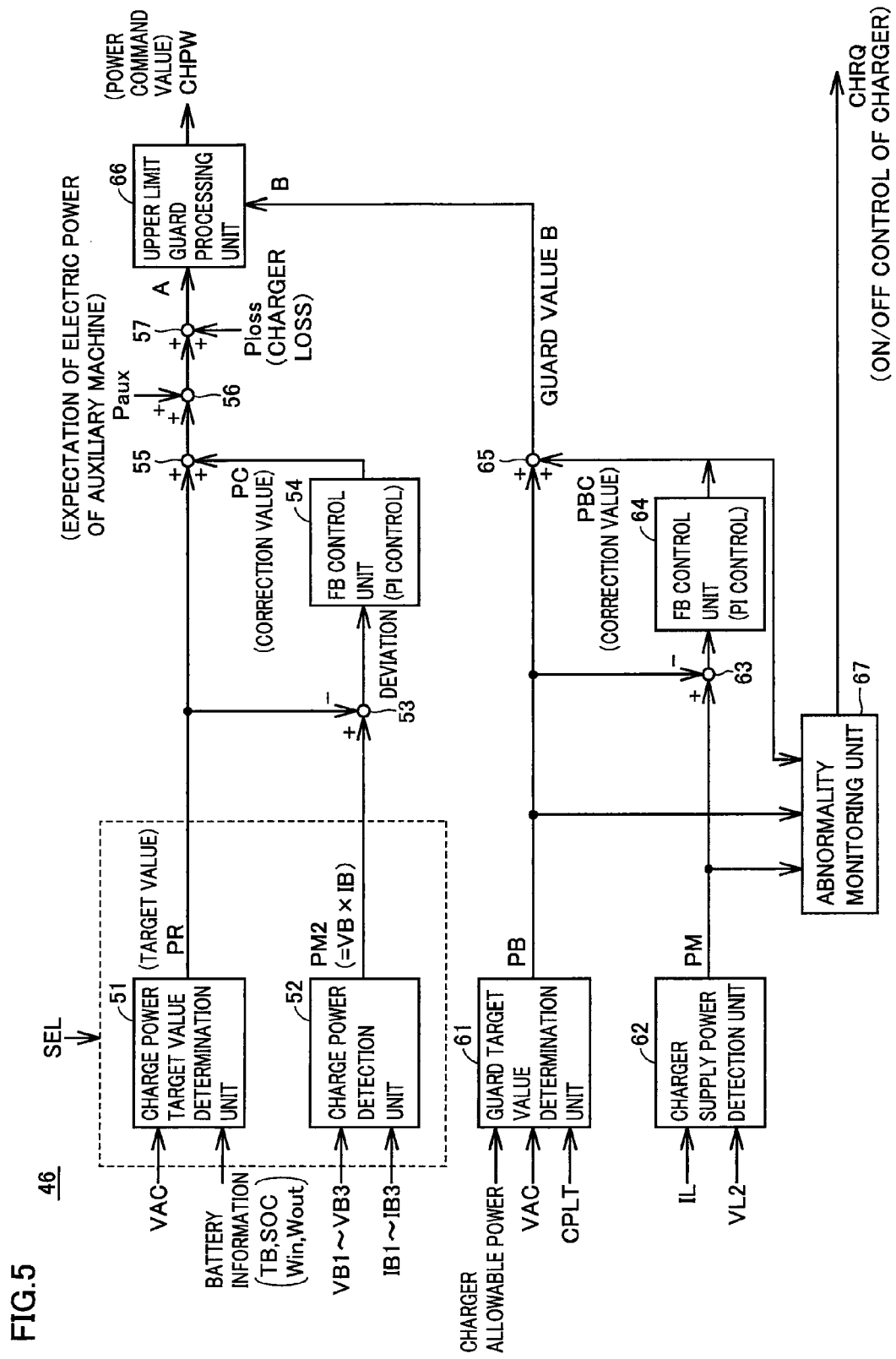
FIG. 5 is a functional block diagram regarding generation of a power command value by charging ECU 46.

FIG. 5 is a functional block diagram regarding generation of a power command value by charging ECU 46.

Referring to FIG. 5, charging ECU 46 includes a charge power target value determination unit 51, a charge power detection unit 52, a subtraction unit 53, a feedback control unit 54, addition units 55, 56, 57, and an upper limit guard processing unit 66.

Charge power target value determination unit 51 sets a target charge power PR based on voltage value VAC (100V/200V) detected by the voltage sensor. When state of charge SOC of the power storage device as a target to be charged is low, target charge power PR is set to be relatively large, which is followed by quick charging. On the other hand, when state of charge SOC of the power storage device as a target to be charged is high, target charge power PR is set to be relatively small, which is followed by additional charging that is slowly carried out after the quick charging. However, when a charge power upper limit value Win is set to be relatively small in accordance with the temperature of the power storage device, target charge power PR is limited thereto.

When power storage device 10-1 is charged by charger 42, charge power detection unit 52 calculates the charge power of power storage device 10-1 based on the detected values of voltage VB1 and current IB1, and outputs the calculation result as a monitor value PM2 to subtraction unit 53. In addition, based on signal SEL transmitted from vehicle ECU which is not shown, it is determined that power storage device 10-1 is charged by charger 42.

Furthermore, when power storage device 10-2 is charged by charger 42, charge power detection unit 52 calculates the charge power of power storage device 10-2 based on the detected values of voltage VB2 and current IB2, and outputs the calculation result as monitor value PM2 to subtraction unit 53. When power storage device 10-3 is charged by charger 42, charge power detection unit 52 calculates the charge power of power storage device 10-3 based on the detected values of voltage VB3 and current IB3, and outputs the calculation result as monitor value PM2 to subtraction unit 53. In addition, based on signal SEL transmitted from vehicle ECU which is not shown, it is determined that power storage device 10-2 or 10-3 is charged by charger 42.

Subtraction unit 53 subtracts target value PR from monitor value PM2, and outputs the calculation result to feedback control unit 54. It is to be noted that target value PR may be different or the same for each of power storage devices 10-1 to 10-3.

Feedback control unit 54 performs a proportional-plus-integral operation (PI control) using, as a control input, a deviation between monitor value PM2 received from subtraction unit 53 and target value PR of the charge power, and outputs the calculation result as a feedback correction value PC. Addition unit 55 adds correction value PC to target value PR. Addition unit 56 adds the calculation result in addition unit 55 to an expected value Paux of the electric power of the auxiliary machine, to which a charger loss Ploss is added by addition unit 57.

Upper limit guard processing unit 66 performs upper limit guard processing for setting a guard value B as an upper limit for a calculation result A in addition unit 57, and outputs power command value CHPW.

In the present embodiment, guard value B provided to upper limit guard processing unit 66 is also corrected by feedback processing.

For the purpose of this processing, charging ECU 46 includes a guard target value determination unit 61, a charger supply power detection unit 62, a subtraction unit 63, a feedback control unit 64, and an addition unit 65.

Guard target value determination unit 61 determines a guard target value PB obtained by multiplying a voltage standard value VACSPC determined based on detected voltage VAC input from the outside and a current standard value IACSPC determined based on pilot signal CPLT. In addition, in the case where the allowable power of charger 42 is smaller than the guard target value determined based on VAC and CPLT, guard target value determination unit 61 sets the allowable power of charger 42 as guard target value PB.

FIG. 6 is a diagram for illustrating voltage standard value VACSPC determined by guard target value determination unit 61 in FIG. 5.

FIG. 7 is a diagram for illustrating a current standard value IACSPC determined by guard target value determination unit 61 in FIG. 5.

Referring to FIGS. 6 and 7, when the VAC sensor value detected by the voltage sensor is not less than 80V and less than 160V, guard target value determination unit 61 determines that the voltage standard value is 100V. Furthermore, when the VAC sensor value is not less than 160V and less than 260V, guard target value determination unit 61 determines that voltage standard value VACSPC is 200V.

Furthermore, when the duty ratio of input pilot signal CPLT falls within the range of 18 to 22%, guard target value determination unit 61 determines that current standard value IACSPC is 12 A. When the duty ratio of pilot signal CPLT falls within the range of 24 to 28%, guard target value determination unit 61 determines that current standard value IACSPC is 16 A. When the duty ratio of pilot signal CPLT falls within the range of 48 to 52%, guard target value determination unit 61 determines that current standard value IACSPC is 24 A. When the duty ratio of pilot signal CPLT falls within the range of 58 to 62%, guard target value determination unit 61 determines that current standard value IACSPC is 32 A. Basically, guard target value PB is determined by calculating the rated power from the product of rated current IACSPC and AC input voltage VACSPC, to subtract the offset value obtained by adaptation from this calculated rated power.

Referring back to FIG. 5, charger supply power detection unit 62 calculates a monitor value PM of the supply power output from charger 42 based on current value IL and voltage value VL2 detected by current sensor 19 and voltage sensor 18-2, respectively, in FIG. 1. Subtraction unit 63 outputs the deviation between monitor value PM and guard target value PB to feedback control unit 64.

Feedback control unit 64 performs a proportional-plus-integral operation (PI control) using, as a control input, a deviation received from subtraction unit 63, and outputs the calculation result to addition unit 65 as a feedback correction value PCB. Addition unit 65 adds guard target value PB and correction value PCB to calculate guard value B. Guard value B is used as an upper limit guard value of power command value CHPW in the upper limit guard processing unit.

It is to be noted that the functional block diagram of charging ECU 46 shown in FIG. 5 can be implemented by software using a computer. Charging ECU 46 may be configured to include one or more computers. Furthermore, charging ECU 46 may be integrated with an ECU for another vehicle control and implemented by one computer.

FIG. 8 is a flowchart for illustrating the program control performed in charging ECU 46.

Referring to FIG. 8, when this process is first started, it is determined in step S1 whether charging ECU 46 is in the state prior to starting of charging. The state prior to starting of charging means the state where external power supply 402 is connected to charger 42 by the charging cable, but the charge power is not yet supplied by charger 42. If charging ECU 46 is in the state prior to starting of charging in step S1, the process proceeds to step S2, in which charging ECU 46 determines guard target value PB based on voltage value VAC detected by voltage sensor 47 and pilot signal CPLT. Guard target value PB is determined by calculating the rated power from the product of rated current IACSPC and AC input voltage VACSPC, to subtract the offset value obtained by adaptation from this calculated rated power. The determination of guard target value PB has been described in FIGS. 6 and 7, and therefore, description thereof will not be repeated.

In the case where charging is already started in step S1 and the case where guard target value PB is determined in step S2, the process proceeds to step S3.

In step S3, a charge feedback correction value PC is determined based on the difference between charge power monitor value PM2 and charge target value PR. Furthermore, a guard feedback correction value PCB is determined based on the difference between monitor value PM of the supply power and guard target value PB.

When the process in step S3 is ended, the process proceeds to step S4, in which a candidate value of power command value CHPW which is to be provided to charger 42 is calculated by adding target value PR, charge feedback correction value PC, expected value Paux of the electric power consumed by auxiliary machine 22, and expected value Ploss of the loss occurring in charger 42.

Then in step S5, power command value CHPW is limited such that the candidate value of power command value CHPW calculated in step S4 is less than or equal to the sum of guard target value PB and correction value PCB.

Then in step S6, it is determined whether the value obtained by subtracting guard target value PB from monitor value PM of the supply power is greater than a predetermined threshold value α. If the condition that PM−PB>α is satisfied, the process proceeds to step S8. If the condition is not satisfied, the process proceeds to step S7.

In step S7, it is determined whether guard correction value PCB is less than a threshold value β having a negative value, and also determined whether this condition continues for a predetermined period of time. If the condition in step S7 is satisfied, the process proceeds to step S8. If the condition is not satisfied, the process proceeds to step S10. In step S10, the control is passed to the main routine for continuation of charging.

On the other hand, the case where the process proceeds from step S6 or S7 to step S8 means that the electric power is supplied in excess of guard target value PB, or that the state where correction value PCB used for correcting guard target value PB is negative continues. In this case, it is considered that an abnormality occurs in the charger. Thus, in step S8, the diagnosis is confirmed that an abnormality occurs in the charger, and in step S9, the system is shut down. When the system is shut down, the charger is controlled to be turned off by control signal CHRQ, and then, system main relays 11-1 to 11-3 are controlled to be turned off.

As described above, according to the present embodiment, when controlling the charger used for external charging, the feedback of guard value B only on the decreased side is preferentially carried out in order to prevent the supply power detected by the sensor within charger 42 from exceeding the upper limit, in addition to the feedback control of charge target value PR in the sensor within the power storage device. Consequently, the breaker provided on the external power supply side can be prevented from tripping, or an abnormality in the charging system that may cause a power failure can be detected.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A charging system for a vehicle for charging a power storage device mounted in the vehicle, said charging system comprising:
   a charger configured to supply electric power from a power supply external to the vehicle so as to charge said power storage device; and
   a charge control device for controlling said charger by generating a power command value to said charger,
   said charge control device including
   a charge power detection unit for detecting charge power supplied to said power storage device,
   a target value determination unit for determining a target value of the charge power to said power storage device,
   a first feedback control unit for correcting said target value based on a difference between said charge power and said target value to generate said power command value,
   a supply power detection unit for detecting supply power output from said charger,
   a guard target value determination unit for determining a guard target value corresponding to an upper limit value of said power command value based on allowable power of a system for charging,
   a second feedback control unit for correcting said guard target value based on a difference between said supply power detected by said supply power detection unit and said guard target value, and
   an upper limit guard processing unit for limiting the target value corrected by said first feedback control unit based on the guard target value corrected by said second feedback control unit.

2. The charging system for a vehicle according to claim 1, wherein said guard target value determination unit obtains, from a signal transmission device, information indicative of an allowable power value of a path through which the electric power is transmitted to said vehicle from said power supply external to the vehicle, said signal transmission device being provided on said path.

3. The charging system for a vehicle according to claim 2, further comprising an abnormality monitoring unit for monitoring an abnormality in said charger based on said guard target value, said supply power and a correction value determined by said second feedback control unit.

4. The charging system for a vehicle according to claim 1, wherein
   said vehicle includes an auxiliary machine capable of being driven by a part of the electric power output from said charger,
   said power storage device includes
   a first power storage device connected to a power supply path to said auxiliary machine, and
   a second power storage device to which an output of said charger is connected,
   said charging system for a vehicle further includes
   a first voltage converter performing voltage conversion between a voltage of said first power storage device and a supply voltage to an electric load, and
   a second voltage converter performing voltage conversion between a voltage of said second power storage device and said supply voltage, and
   said charge control device is configured to control said first and second voltage converters to select one of said first and second power storage devices as a target to be supplied with said charge power from said charger.

5. The charging system for a vehicle according to claim 1, wherein
   said vehicle includes
   a motor for driving the vehicle, said motor operating with the electric power received from said power storage device, and
   an internal combustion engine used for driving the vehicle in combination with said motor.

* * * * *